US009110768B2

(12) United States Patent
Iacobovici

(10) Patent No.: US 9,110,768 B2
(45) Date of Patent: Aug. 18, 2015

(54) RESIDUE BASED ERROR DETECTION FOR INTEGER AND FLOATING POINT EXECUTION UNITS

(71) Applicant: INTEL CORPORATION, Santa Clara, CA (US)

(72) Inventor: Sorin Iacobovici, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 13/730,008

(22) Filed: Dec. 28, 2012

(65) Prior Publication Data

US 2014/0188965 A1 Jul. 3, 2014

(51) Int. Cl.
*G06F 11/10* (2006.01)
*G06F 7/72* (2006.01)

(52) U.S. Cl.
CPC ........................................ *G06F 7/72* (2013.01)

(58) Field of Classification Search
None
See application file for complete search history.

(56) References Cited

U.S. PATENT DOCUMENTS

| 3,816,728 | A | * | 6/1974 | Chen et al. ................... | 708/532 |
| 4,924,467 | A | * | 5/1990 | Criswell ....................... | 714/820 |
| 4,926,374 | A | * | 5/1990 | Schaffer ....................... | 708/532 |
| 6,694,344 | B1 | * | 2/2004 | Gerwig et al. ............... | 708/532 |
| 8,566,383 | B2 | * | 10/2013 | Dao et al. ..................... | 708/532 |
| 2008/0162618 | A1 | * | 7/2008 | Busaba et al. ............... | 708/532 |
| 2014/0188965 | A1 | * | 7/2014 | Iacobovici ................... | 708/491 |

* cited by examiner

*Primary Examiner* — David H Malzahn
(74) *Attorney, Agent, or Firm* — Kenyon & Kenyon LLP

(57) ABSTRACT

An error detection unit including one or more register files that store at least one operand and at least one operand residue, an operand multiplexor operable to receive the operand, a residue multiplexor operable to receive the operand residue, a source operand residue generator operable to generate at least one generated residue from the operand, a first comparator that compares the operand residue to the generated residue, the result of the first comparator being sent to a reorder buffer, an execution unit that supplies the operand to a residue calculator and a result residue generator, wherein the residue calculator operable to determine an expected residue and the result residue generator operable to generate a result residue, and a second comparator that compares the expected residue with the result residue, the result of the second comparator being sent to the reorder buffer.

15 Claims, 10 Drawing Sheets

RESIDUE BASED ERROR DETECTION FOR INTEGER AND FLOATING POINT EXECUTION UNITS

FIELD OF THE INVENTION

The present disclosure relates to error detection and, in particular, residue-based error detection.

BACKGROUND

As technology improves and the number of transistors per chip continues to grow exponentially, CPU microprocessors have more cores and integrate more functions into their uncore (i.e., parts of the microprocessor that are not part of the core). In addition, with increasing processor speeds, processors today execute an ever growing number of instructions. As a result, the potential for errors increases. Meanwhile, it remains desirable to provide the same CPU chip availability despite the potential for an increased error rate.

Instructions typically use resources, such as a physical register file (PRF), for performing operations included in the instructions. Sometimes, however, a PRF becomes corrupted, which can result in an execution error. To account for such errors, conventional systems apply parity error detection on the PRF. In parity error detection, data written to a register will have an additional parity bit included. The parity error detection will check the state of the parity error (usually even or odd), which corresponds to the integrity of the data. If a parity error is detected, conventional systems will typically trigger a machine check error (MCE). Unfortunately, a MCE, is usually a catastrophic failure that generally requires a restart of the processor and may also result in loss of data. Hence, MCEs not the preferred solution and their occurrence should be minimized.

In addition, mission critical (MC) systems as well as larger and larger high performance computing (HPC) systems being built, with tens of thousands or hundreds of thousands CPU sockets working on an application, require an uptime of weeks or longer in order to complete their tasks. The MTBF (Mean Time Between Failures) requirements for those systems are very challenging. Using techniques like chip lockstep or core lockstep for error detection is not only difficult to implement, but almost doubles the CPU power consumption in the system.

As achieving the desired CPU availability starts with error detection, there is a need for efficient, low cost error detection mechanisms that detect all error types (soft, hard, etc.) in the storage elements, as well as in the logic blocks of the CPU chips. Accordingly, a mechanism for detection of errors in CPU cores' integer execution units executing scalar integer operations, floating-point (FP) execution units executing scalar FP operations, SIMD operations, address generation (AGUs), etc. is provided.

DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
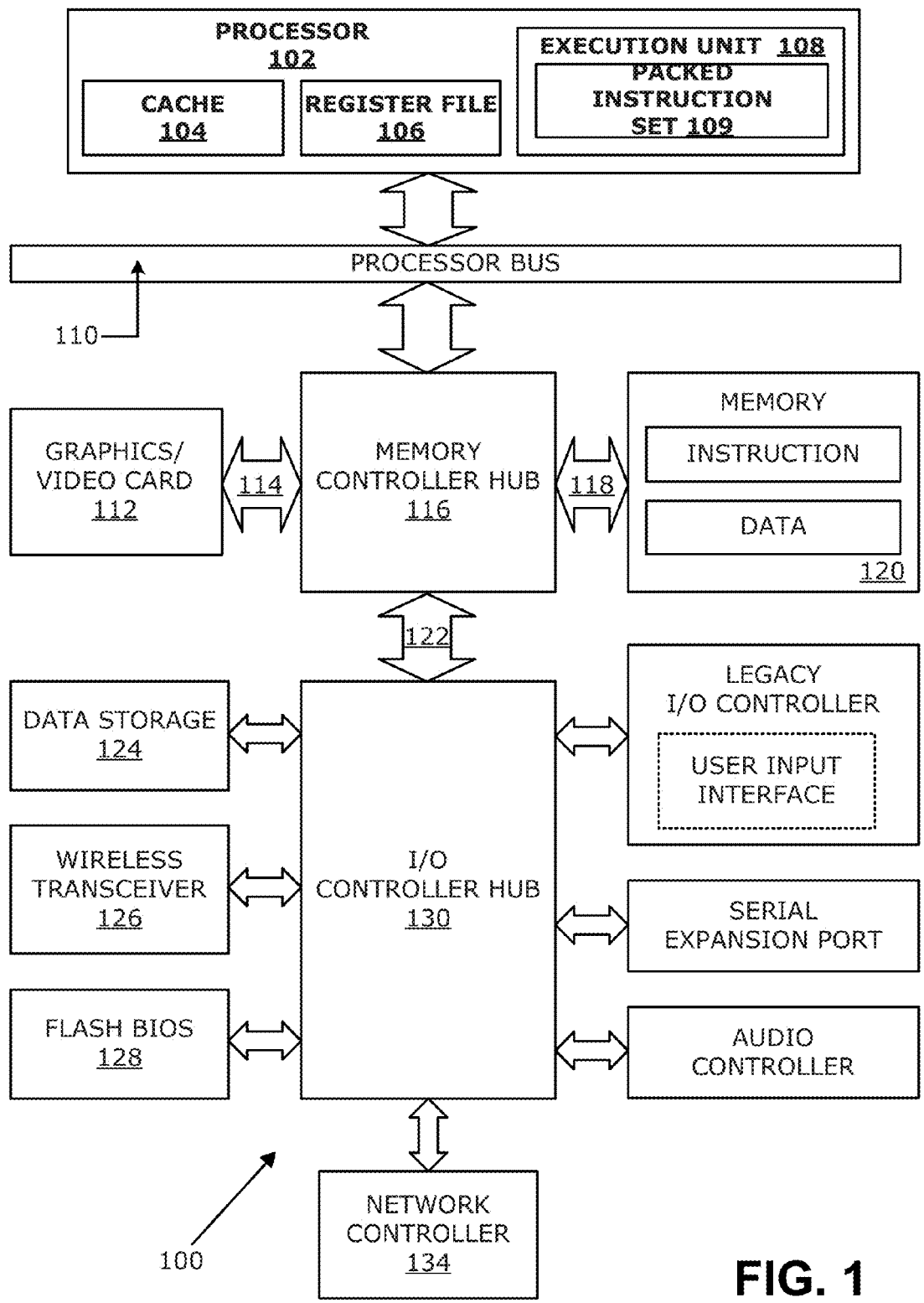
FIG. 1 illustrates a simplified block diagram of a system according to an example embodiment of the present invention.

Embodiments of the present invention may provide an error recovery unit that may include error logic to detect an error in a dispatch port and timestamp logic configured to generate a timestamp for the error. The error recovery unit may also include check logic to determine if an instruction associated with the error has been retired based on the timestamp. If the instruction has been retired, a machine check error logic may be initiated. If the instruction has not been retired, an error correction logic may be initiated to recover the error and to re-execute the instruction. Thus, speculative errors may be recovered without the need for calling the machine check error, which is undesirable because of its uncorrectable nature. Therefore, machine check errors may be significantly reduced.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two or three source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1 is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1 is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Errors in both the logic and the storage elements (latches, registers, arrays) of a CPU's integer execution units can be detected using residues in an end-to-end fashion. The residue properties and the end-to-end solution described herein for a CPU's integer execution units (including the address generation units) and floating point (FP) execution units (including vector execution units) provide a low cost and efficient error detection technique.

The integer operations executed by the integer execution units of the CPU cores are very diverse. Similarly, the FP and non-FP operations executed by the CPU cores' FP execution units are also very diverse. They can be scalar (single data) or single instruction multiple data (SIMD), arithmetic, or bit manipulation, etc. The data processed by each such operation can be 8 bit, 16 bit, 32 bit, 64 bit, etc. depending on the CPU's architecture and on the instruction. Error detection for such diverse operations is challenging. There are cases when the designers might decide that detecting errors for a certain operation or groups of operations is not advantageous due to the cost or complexity of the error detection as compared to the small amount of logic or storage elements covered. A good error detection mechanism allows the designers to forego detecting errors for those operations or small logic blocks while still detecting errors for the rest of the operations and logic blocks of the integer execution units and the FP execution units. As error detection for subsequent operations might depend on the operation without error detection, foregoing error detection for that operation should not result in an error detection discontinuity.

The example embodiments of the present invention take advantage of an arithmetic property of residues, as well as the way residues of a binary number are generated. The residue of a number N is N mod D, where D is a Merrill number, i.e., a number calculated as $D=2^k-1$. As an example, for a two bit residue k=2, the Merrill number D=3. The arithmetic property of residues states that for arithmetic operations and any number D:

$$(X \text{ op } Y) \bmod D = ((X \bmod D) \text{ op } (Y \bmod D)) \bmod D.$$

In other words, the residue of an arithmetic operation's result is equal to the residue of the result of the same arithmetic operation applied to the source operands' residues. For example, the mod3 of the sum (A+B) should equal the mod3 of the sum of the respective mod3 of A and B. Although other size residues can be used, this example embodiment uses a two bit residue. A two bit residue provides a good tradeoff between cost and error coverage.

In addition, the residue of data values is also generated. For example, the residue of source registers or result registers can be generated. For a number N where D=3, representing the number N in base 4 and applying the residues' arithmetic property, N's residue is given by:

$$N \bmod 3 = (a_{n-1}*4^{n-1} + a_{n-2}*4^{n-2} + \ldots + a_1*4^1 + a_0) \bmod 3 = (a_{n-1} + a_{n-2} + \ldots + a_1 + a_0) \bmod 3.$$

N's base-4 coefficients are N's bits, grouped in groups of two, starting with the least significant bit (LSB).

Any size residue can be obtained as a result of source residue checking. Accordingly, in order to minimize overhead, the residue saved in the register file can be for as large a data size as desired. For example, if the largest integer operand is 64 bits, the residue saved in the register file is for 64 bits. In this example, 64 bits is used even when the integer operations are executed for lower operand sizes (e.g., 8 bits, 16 bits, 32 bits).

Figure 2A:
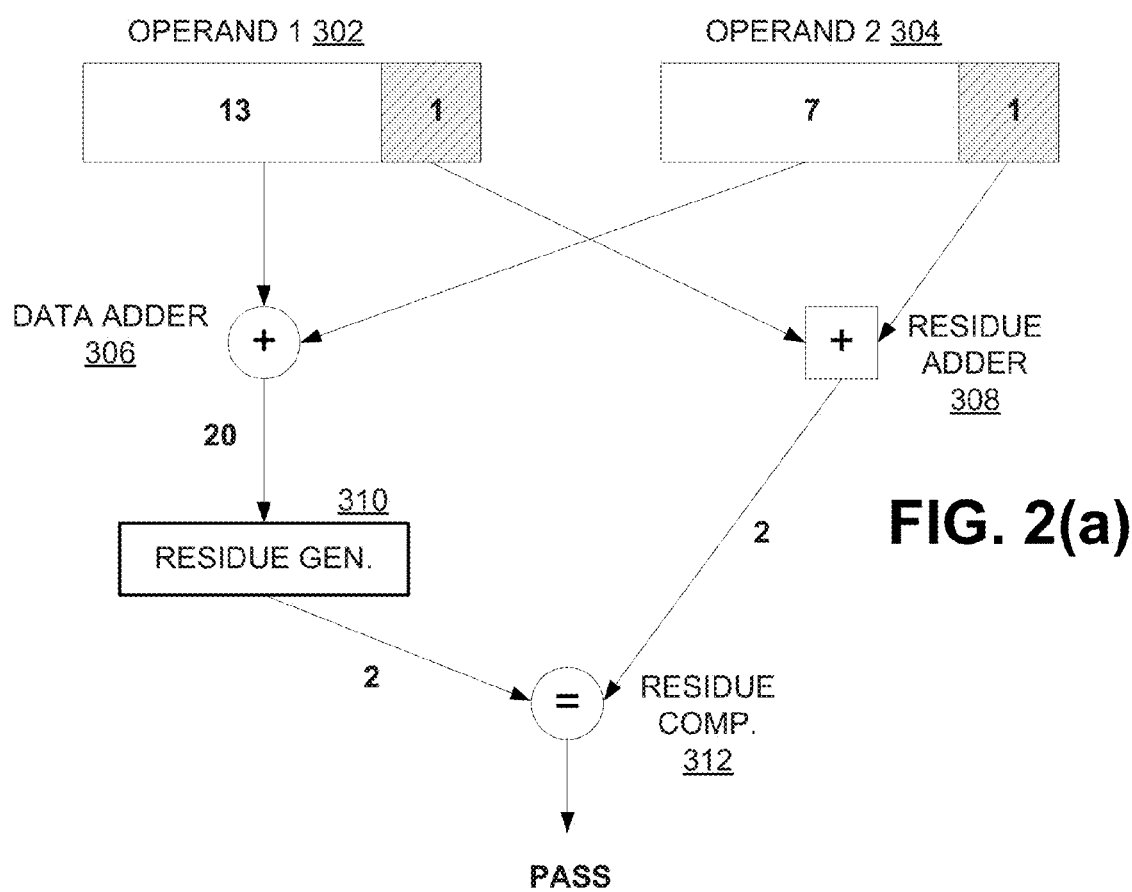
FIGS. 2(a)-(c) illustrate a residue check operation according to an example embodiment of the present invention.
Figure 2B:
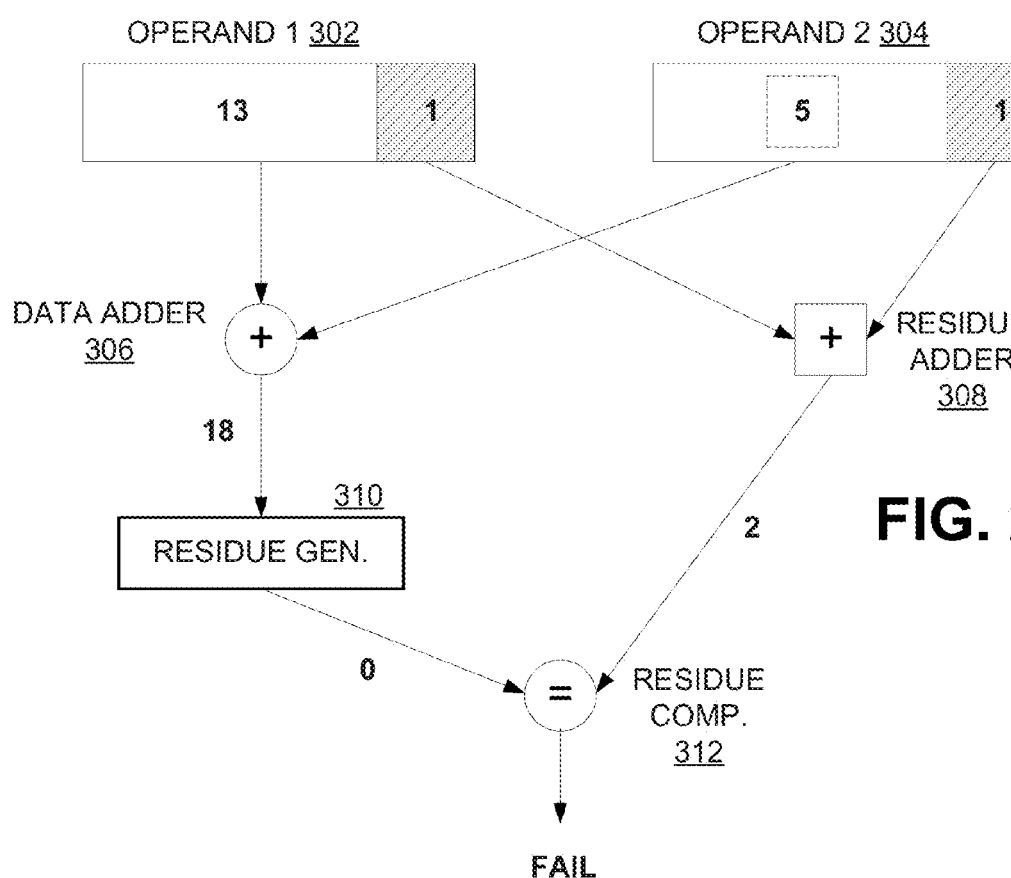
Figure 2C:
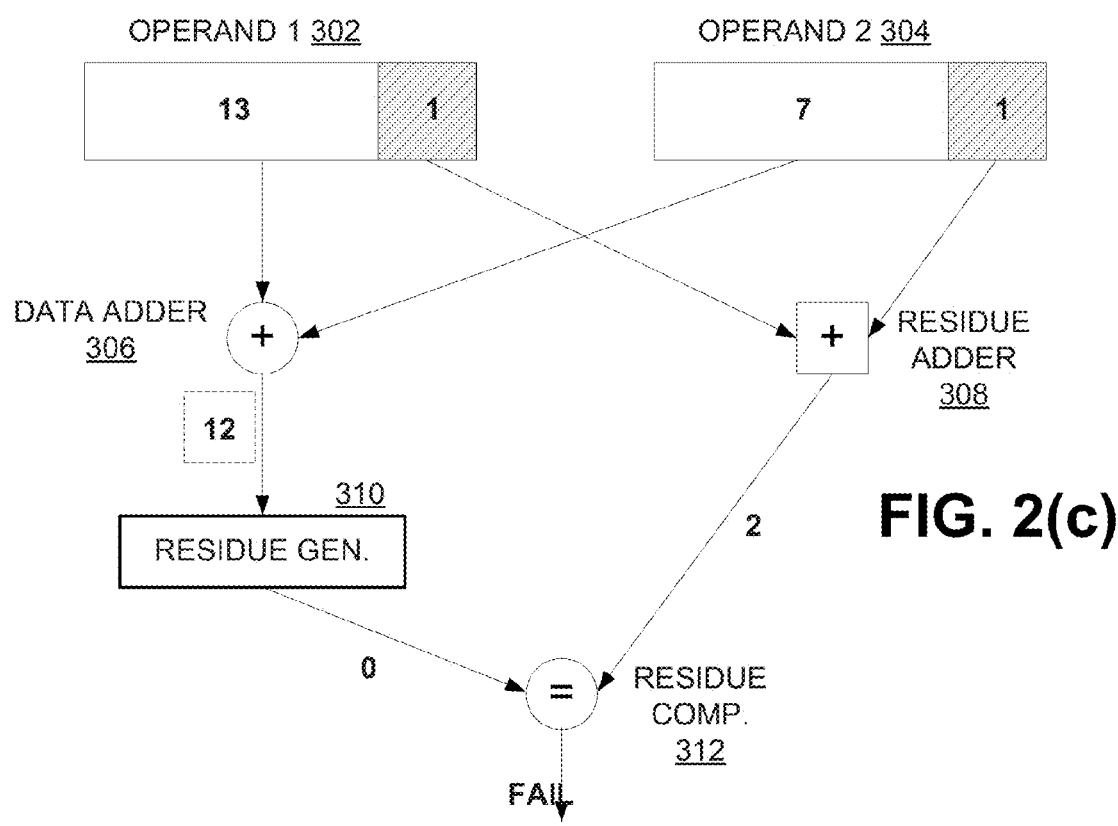

FIGS. 2(a)-(c) illustrate a residue check operation according to an example embodiment of the present invention. The residue check can include two or more operands 302, 304, a data adder 306, a residue adder 308, a residue generator 310, and a residue comparator 312. The operands 302 and 304 may include a data portion and a residue portion (e.g., operand 1 302: data=13, residue=1; operand 2 304: data=7, residue=1). The data adder 306 can sum the data portions of the operands 302, 304, and the residue adder may sum the residue portions of the operands 302, 304. The residue generator 310 may generate the residue of the addition result from the data adder 306. The residue comparator 312 may compare the outputs of the residue adder 308 and the residue generator 310. The comparison result of the residue comparator 312 may indicate the presence or absence of a residue error. The comparison result may be a single bit error/no error (pass/fail) value.

FIG. 2(a) illustrates a "pass" example where no residue error was detected. A residue error may be caused by various reasons such as corruption of a PRF value or an operation failure. FIG. 2(b) illustrates a "fail" example where a residue error was detected, and the residue error was due to a corruption of the PRF value for operand 2, a corruption of the operand 2 source register 304, etc. In FIG. 2(b), a single bit error in operand 2 304 in the data portion value, which changed that value from "7" to "5" (binary 111 to 101), caused the residue error. FIG. 2(c) illustrates another "fail" example where a residue error was detected, and the residue error, in this example, was due to a carry failure. A carry problem in the data adder 306 changed the sum result to "12" instead of the correct value of "20."

Residue can detect multiple bit errors, but is limited due to the aliasing. For example, a double bit data error that flips 00 to 11 or the other way around will not be detected due to aliasing (e.g., 11 has the same residue as 00). On the other hand, a double bit data error that flips 01 to 10 or the other way around will be detected (i.e., no aliasing has occurred).

The examples of FIG. 2. illustrate a data sum operation for illustration purposes only. Embodiments of the present invention including residue checkers may be provided for other data operations such as count, multiply, read, etc.

Figure 3:
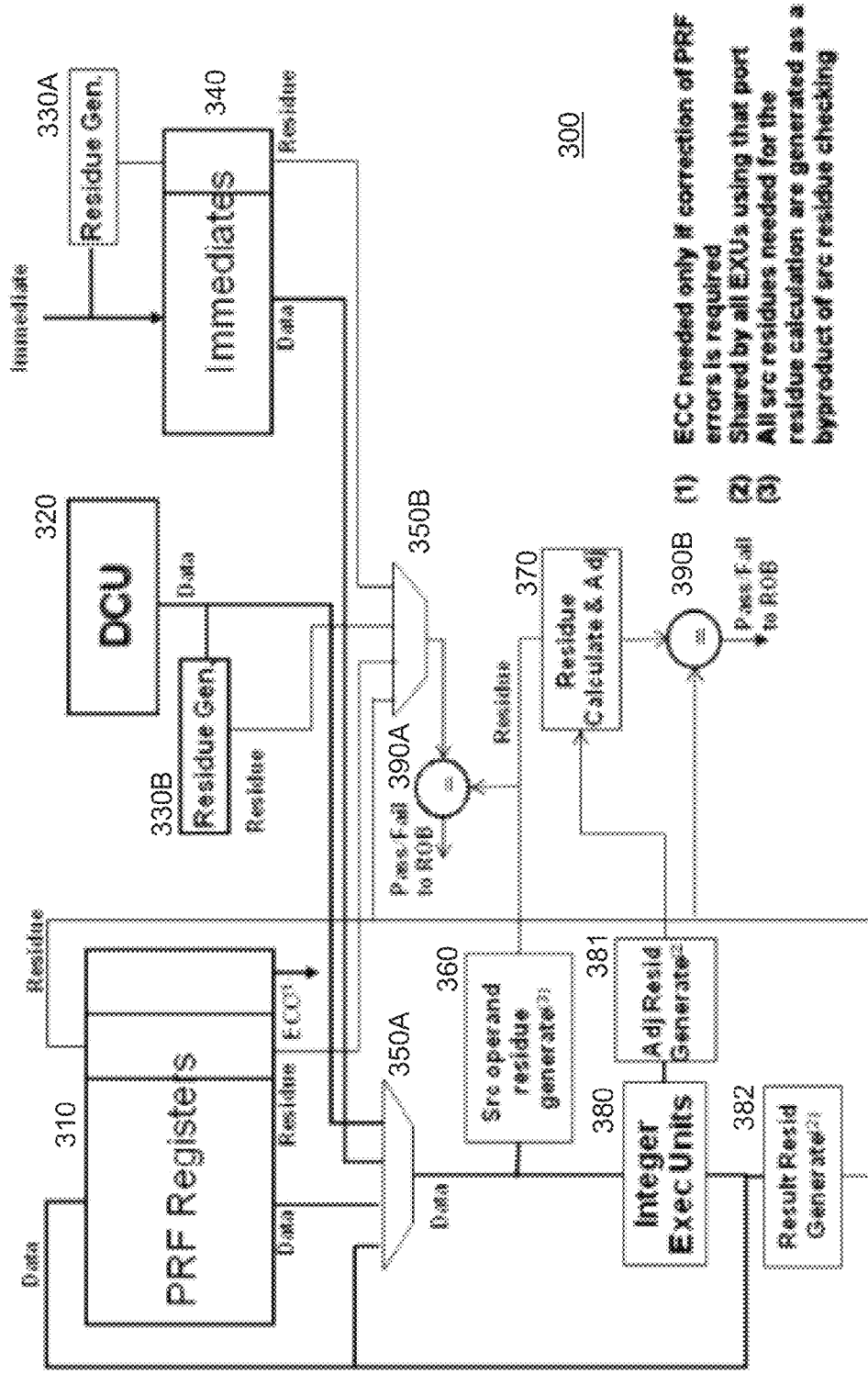
FIG. 3 illustrates an end-to-end error detection mechanism using residue checking for an integer execution unit (IEU) port according to an example embodiment of the present invention.

FIG. 3 illustrates an end-to-end error detection mechanism 300 using residue checking for an integer execution unit (IEU) port according to an example embodiment of the present invention.

As shown in FIG. 3, the example end-to-end error detection mechanism 300 includes a PRF register file 310, data cache unit 320, residue generators 330A and 330B, immediate register file 340, bypass multiplexers 350A and 350B, source operand residue generator 360, residue calculator and adjustor 370, adjust residue generator 381, result residue generator 382, and comparators 390A and 390B.

PRF register file 310, data cache unit 320, immediate buffer 330 are coupled to supply data of source operands to bypass multiplexer 350A and coupled to supply residues of operands to bypass multiplexer 350B. The data received from the data cache unit 320 is also sent to the integer execution units 380 together with its residue which is generated by residue generator 330A. The residue can be used to protect the data of data cache unit 320. Alternatively, the residue can be generated after reading data of data cache unit 320 which can be protected by parity or an error correcting code (ECC). In the embodiment depicted in FIG. 3, the PRF register file 310 uses residue for error detection. Similarly, the immediate register file 340 is coupled to residue generator 330B, and uses residue for detection of errors in its own array and in the execution unit.

The data of PRF register file 310, data cache unit 320, and immediate register file 340, together with their respective residues, are multiplexed by the bypass multiplexors 350A and 350B according to the nature of the integer operation's source operands and usually latched in the proper source operand registers. Although the operands and residues use separate bypass multiplexors, they can use the same select control values. The select control values of the bypass multiplexors may be subject to a delay. Once the source operand data is available, one of the integer execution units 380 executes the operation independently of how the residue is processed.

In addition, the source operands data can be supplied to the source operand residue generator 360 in order to generate the residues of the source operands. At comparator 390A, the residues of the source operands are compared to the corresponding residues received from the residue bypass multiplexor 350B. The result of the source operand comparison (i.e., pass or fail) is communicated to the CPU core's re-order buffer (ROB) (not shown), and details of the error can be captured in a logging register (not shown). A pass value in the ROB indicates that an error has not occurred. By contrast, a fail value in the ROB indicates that an error has occurred. When an error has occurred, a recovery mechanism (e.g., machine check or trap) can be invoked when the operation reaches the commit pipeline stage. The result of the executed integer operation, if any, is saved in the result register and bypassed, as needed, to dependent operations.

The result data is also saved in the entry of the PRF register file 310 corresponding to destination register of the operation and is supplied to the result residue generator 382 in order to generate the result data's residue. This result residue can be compared with the residue value that is calculated using the residues of the source operands in order to detect errors of one of the integer execution units 380. The result data's residue (i.e., not the calculated residue) is the residue value saved in the PRF register file 310 and sent to the residue bypass multiplexor 350B. As a result, dependent operations and the PRF register file 310 obtain the result residue value together with the result data even when the designers decide to forego checking some integer operations (i.e., when the calculated residue is not generated).

The residue calculator and adjustor 370 selects the proper source operands' residues and calculates the expected result residue ("calculated" residue). At comparator 390B, the expected result residue is compared with the residue generated using the result data in order to detect errors in the integer execution unit 380. The pass or fail result of this comparison is sent to the re-order buffer (not-shown), and the result can be applied as the source register pass or fail. In addition, the "calculated" residue of residue calculator and adjustor 370 and the residue of adjust residue generator 381 can be combined before being compared with the result's residue.

In general, each of the operation result's bits are part of the result register and the data is maintained. In some instances, however, there are operations where some of the bits are not in the result register due to the register's size constraints. For example, a multiply operation on two 64 bit source operands can have a 128 bit result, while the result register's size is 64 bits. Depending on the operation, either the lower 64 bits or the upper 64 bits are captured in the result register, so the result data's residue will reflect only those bits. However, the "calculated" residue will reflect the 128 bit result.

In order to check the multiply functions of the integer execution units 380, the residue of the "other" 64 bits of the multiply result (i.e., the ones not in the result register) are used in order to account for their elimination by adjusting the "calculated" residue before comparing with the result data's residue. To do so, the integer execution units 380 (i.e., the multiplier) captures those "other" 64 bits and sends them to adjust residue generator 381 shared by the execution units of that IEU port. The "adjust" residue is subtracted, mod3, from the "calculated" multiply residue, and the resulting residue is compared to the result data's residue in order to generate the pass or fail result for the re-order buffer.

Integer execution units (i.e., ALUs, multipliers, shifters, etc.) of the integer execution unit 380 are generally grouped into a number of "ports." The execution units belonging to the same port share the port's source operand registers, bypass multiplexors, result register, etc. Only one of the execution units of a given port can operate at a given time. However, execution units belonging to separate ports can execute in parallel. Address generation units (AGU) usually belong to separate load and/or store ports.

An "adjust" residue can also be used for bit operations. For example, a shift operation might eliminate some of its bits and replace them with zeros or the sign bit. In order to check the shift operation, the integer execution unit 18 can generate a mask (i.e., using the shift count source operand's data) in order to capture the eliminated bits and send them to the adjust residue generator 381 of that port. The "adjust" residue and the LSB of the shift count (i.e., even or odd shift) are then sent to the residue calculator and adjustor 370 in order to properly adjust the shifted source operand's residue. As a result, the resulting residue can be compared to the result data's residue in order to generate the pass or fail result for the re-order buffer.

The example embodiment of FIG. 3 provides improved error detection. For example, known residue checking methods for a multiply operation where the residue of one of the source operands is zero and the other operand's data has an error will not detect that source operand error if error detection depends solely on the result's residue checking. However, the example embodiment of FIG. 3 will detect this error as part of the source operand checking. Because source operand residue checking is provided, foregoing on checking certain operations constrains the loss of coverage to only the execution logic. By contrast, mechanisms that depend solely on the result's residue checking for error detection will not detect errors in the execution logic that designers choose to forego, and will not detect errors in their source operands' data paths (i.e., register files, bypass, source operand registers, etc.).

Figure 4:
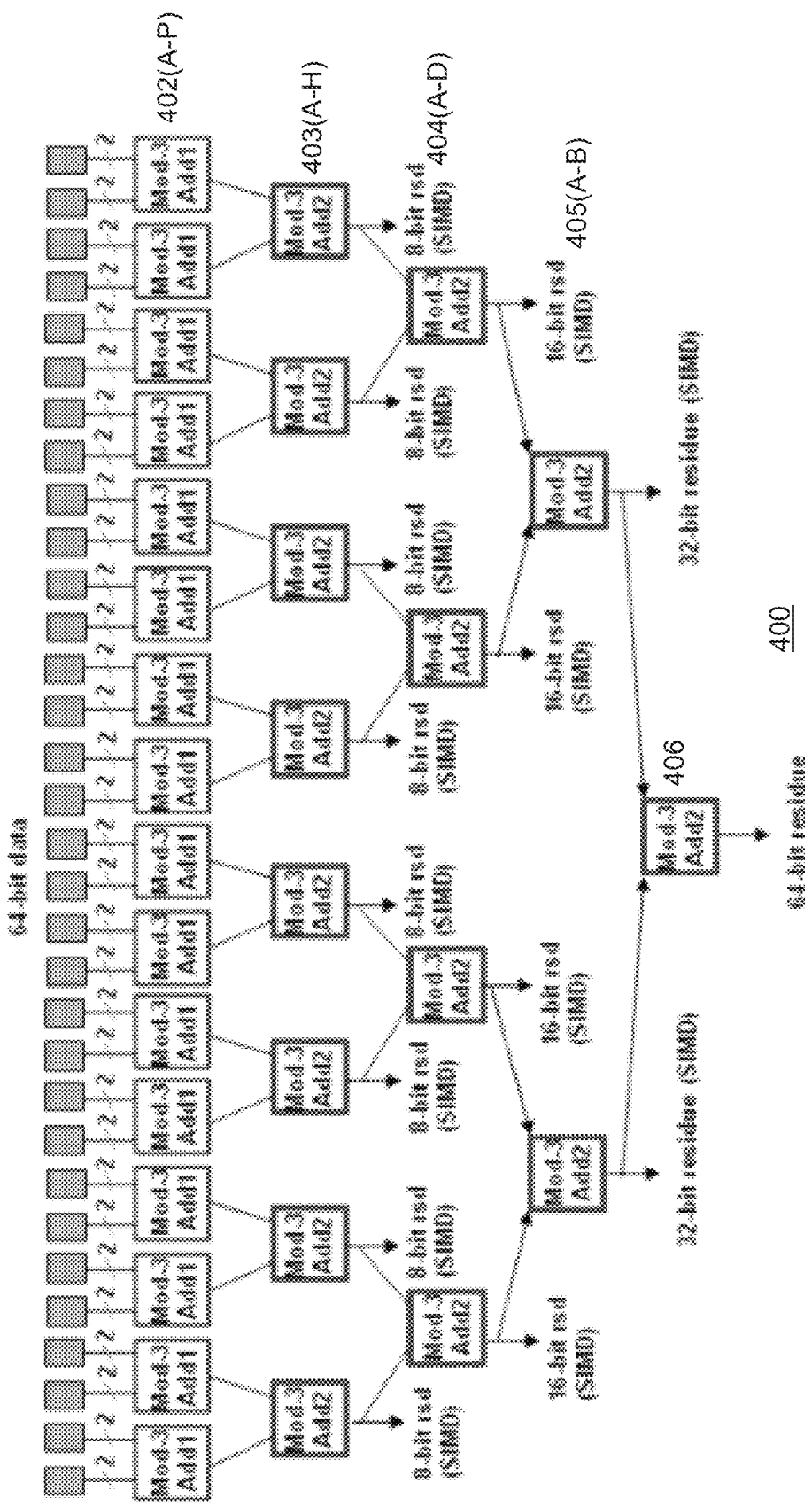
FIG. 4 illustrates residue generation according to an example embodiment of the present invention.

FIG. 4 illustrates a residue generator 400 according to an example embodiment of the present invention.

Although 64-bit data is illustrated and discussed, it is understood that other data sizes may be used. As shown in FIG. 4, a series of storage cells contain a 64-bit data value. Storage cells are connected to a first series of mod3 adder units 402A-P. Each of the adder units 402A-P adds the received pair of two-bit data and calculates the mod3 of the sum. The results are then forwarded to a second series of mod3 adder units 403A-H, a third series of mod3 adder units 404A-D, and a fourth series of mod3 adder units 405A-B. The output of mod3 adder units 405A-B are supplied to adder unit 406, which outputs a mod3 residue value.

As described above, the data bits are grouped in groups of two, then added, mod3, two groups at a time, in a tree fashion until to a two bit residue of the 64-bit data. Both the ADD1 logic used by the first row of adders in the residue generation tree and the ADD2 logic used by the other rows of the tree is to add, mod3, two groups of two bits. The difference is that ADD1's source data have "legal" values from zero to three, while the ADD2's "legal" values are zero to two (mod3 residues' values are zero to two).

As shown in FIG. 4, the residue generation also produces the 8-bit, 16-bit and 32-bit residues as intermediate terms of the 64-bit generation. Another feature of the example embodiment illustrated in FIG. 4 is that all the data bits participate in the generation of the residue. So if any of the source data bits are wrong (i.e., bit error), the generated residue will differ from the source residue received together with the data.

Referring back to FIG. 3, the source operand residue generator 360 block can generate the residue for each source data received from the bypass multiplexor 350A in order to compare it to the corresponding residue from the same source for source data error detection. The source operand residue generator 360 can also generate the residue (e.g., residues for SIMD operations) for the source operand(s)' size required for that operation.

As the generated residue will differ from the source residue when any of the source data bits are wrong, the residue generated by the result residue generator 382 is saved in the PRF register file 310 and/or bypassed together with the data as a way to detect errors in those registers when the same register is used as a source operand by a dependent operation.

Figure 5:
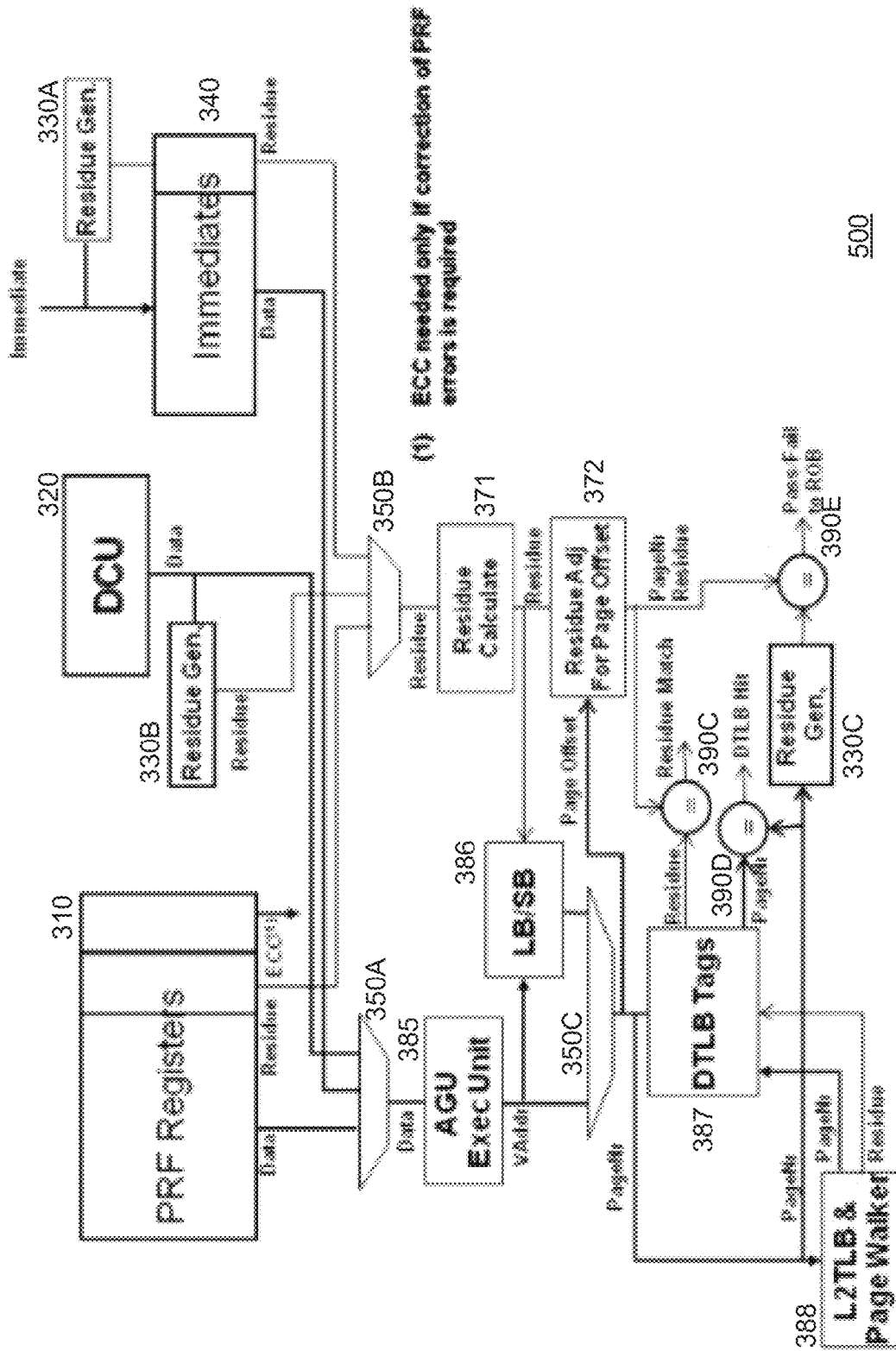
FIG. 5 illustrates an end-to-end error detection mechanism for one of the integer execution unit's address generation unit (AGU) ports according to an example embodiment of the present invention.

FIG. 5 illustrates an end-to-end error detection mechanism for one of the integer execution unit's address generation unit (AGU) ports according to an example embodiment of the present invention.

As shown in FIG. 5, the end-to-end error detection mechanism 500 includes a PRF register file 310, data cache unit 320, residue generators 330A, 330B, and 330C, immediate register file 340, multiplexers 350A, 350B, and 350C, residue calculator 371, residue adjust for page offset 372, AGU execution unit 385, load buffer and a store buffer LB/SB 386, data translation lookaside buffer (DTLB) 387, level two translation lookaside buffer (L2TLB) 388, and comparators 390C, 390D, and 390E.

The AGU ports of the integer execution units 380, which generate the virtual addresses for loads and stores, uses a cheaper variation of the residue checking AGU execution units 385 generate the address for load and store operations. As depicted in FIG. 5, the source operands of AGU execution units 385 are generated in the same manner as for the integer execution unit 380 of FIG. 3. However, the output of AGU execution units 385 is provided to the DTLB 387 as a virtual address, rather than being saved into a register file and bypassed. As a result, the embodiment in FIG. 5 checks the correctness of the result on the DTLB side rather than in the AGU port itself. A local check is also possible, but with less error coverage.

AGU execution units 385 also execute a very small number of operation types as part of the (virtual) address calculation and they usually use one data size for the calculation, even in cases when the address can have multiple sizes. These operations can be checked using residues and the small potential multiplier operand never has a zero residue. Because there is no need to forego operations and the residue of one of the multiply operands is never zero and is constant for the given operation, there is no need to check the source operands (because the multiplier operand is always a power of 2, usually 1, 2, 4, or 8, so the residue is always a non-zero).

Similar to the example embodiment of FIG. 3, the source operands and corresponding residues supplied to the AGU execution unit 385 and residue calculator 371 by multiplexors 350A and 350B, respectively. The virtual address (VAddr) generated by the AGU execution unit 385 is usually saved in a LB/SB 386 and is also sent to the DTLB 387 to start the load or store provided that the DTLB 387 can accept a new request and there are no higher priority requests pending. In the event that the DTLB 387 is busy, the request is repeated by the LB/SB 386 until satisfied. The DTLB 387 operates to handle multiple load and store requests in parallel according to the number of ports it has.

On the residue side, the expected residue for the virtual address is generated with few gates using the source operands' residues from the PRF register file 310, immediate register file 340, or bypass multiplexors 350. This "calculated" residue is saved in the LB/SB 386 together with the virtual address to be used in case of replay and potentially other LB/SB 386 error detection.

In performing VAddr error detection at the DTLB 387, the DTLB 387 uses "page number" bits of the VAddr as DTLB index and tag bits and disregards the lower page offset bits. Thus, the expected page number residue is obtained by generating the residue of the page offset bits of VAddr and subtracting it, mod3, from the "calculated" residue representing the residue of the full VAddr. This residue is compared with the residue saved in the DTLB 387 in addition to the page number bits representing the DTLB tag. Although the DTLB 387 uses a few page number bits as DTLB index and the rest as a DTLB tag, a residue for both the DTLB index and tag bits is also saved in order to also detect index errors. When the DTLB tag matching indicates a DTLB tag hit and a corresponding residue match is obtained, a DTLB hit and read the corresponding physical address and page attributes from the DTLB data side is signaled. Both a DTLB tag match and a DTLB residue match are treated as a hit. However, no tag match or a residue mismatch even when there is a DTLB tag match are treated as a DTLB miss and a request is issued to the L2TLB 388 in order to bring the page translation into the DTLB. The L2TLB usually has a single one port. As a result, there is a need for only one residue generator 330C for the page number bits in order to make sure that the translated VAddr is correct. The page number and its residue for the translated page are saved in the DTLB 387 by the L2TLB 388 in order to be later used when searching the DTLB 387.

Figure 6:
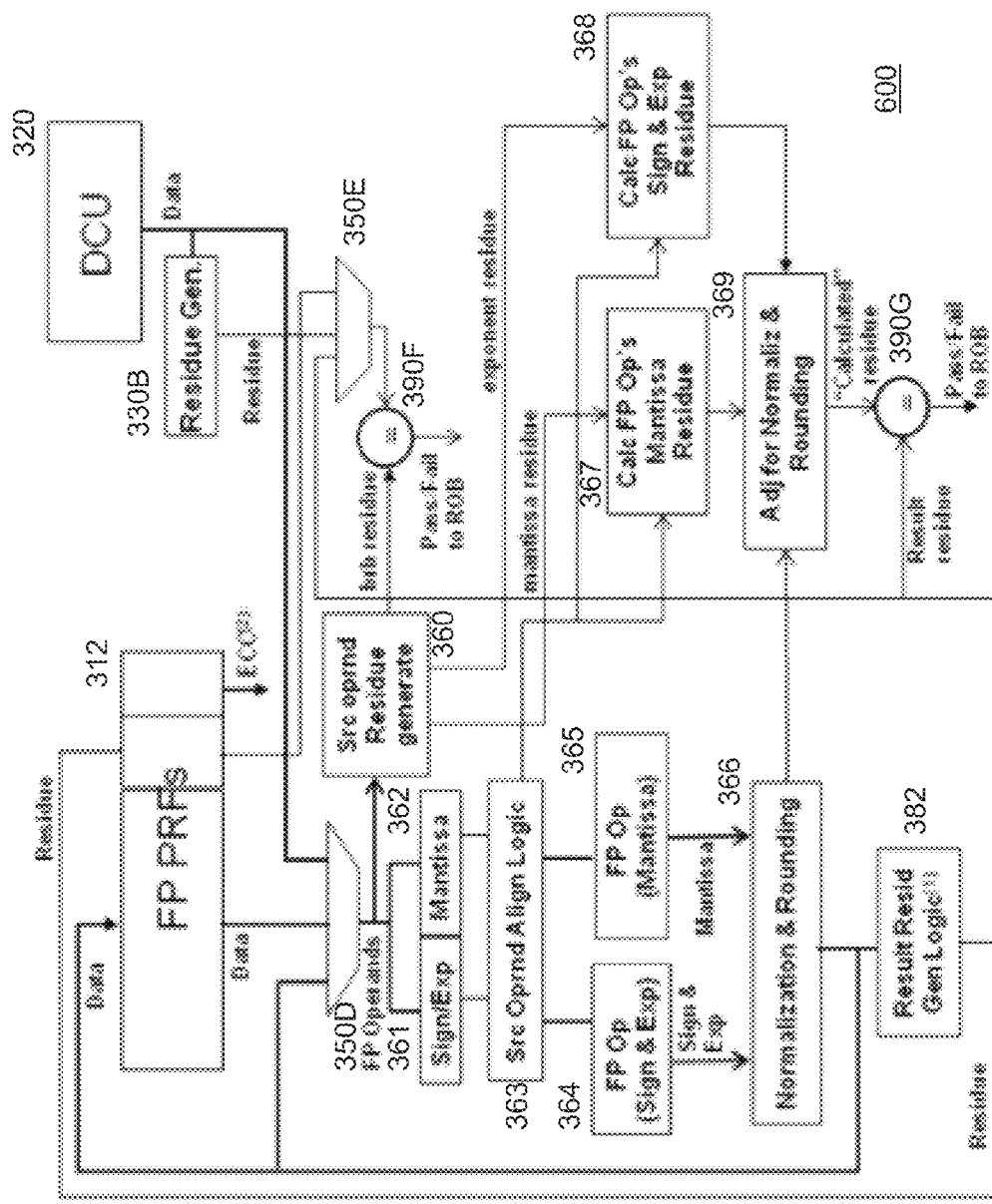
FIG. 6 illustrates an end-to-end error detection mechanism using residue checking for one of the floating point execution units' (FPU) or vector execution units' (VPU) ports according to an example embodiment of the present invention.

FIG. 6 illustrates an end-to-end error detection mechanism 600 using residue checking for one of the floating point execution units' (FPU) or vector execution units' (VPU) ports according to an example embodiment of the present invention.

As shown in FIG. 6, the end-to-end error detection mechanism 600 includes a PRF register file 312, data cache unit 320, residue generators 330B, multiplexers 350D and 350E, source operand residue generator 360, sign/exponent blocks 361, 364, and 368, mantissa blocks 362, 365, and 367, source operand align logic 363, normalization and rounding logic 366, adjust for normalization and rounding logic 369, result residue generator 382, and residue comparators 390F and 390G.

FP PRF register file 312 and data cache unit 320 are coupled to supply operands (i.e., data) to multiplexer 350D and coupled to supply operand residues to multiplexer 350E. The memory data received from the data cache unit 320 is sent to the FPU or VPU together with its residue. The residue can be used to protect the data of data cache unit 320. Alternatively, the residue can be generated after reading data of data cache unit 320 which can be protected by parity or an error correcting code (ECC). In the embodiment depicted in FIG. 6, the FP PRF register file 312 uses residue for error detection.

The data of FP PRF register file 312 and memory data of data cache unit 320, together with their residues, are multiplexed by bypass multiplexors 350D and 350E according to the nature of the FP operation's source operands and usually latched in source operand registers. Although the operands and residues use separate bypass multiplexers, they can use the same select values, one of which may be subject to delay. Once the source operand data is available, the proper unit in the FPU executes the operation independently of how the residue is processed.

In addition, the source operands' data is supplied to the source operand residue generator 360 in order to generate "bits are bits" (BRB) residues of the source operands. At comparator 390F, the BRB residues are compared with the corresponding residues received from the residue bypass multiplexor 350E. The result of the source operands' comparison (i.e., pass or fail) is communicated to the CPU core's re-order buffer (ROB), and details of the error can be captured in a logging register (not shown). A pass value indicates that an error has not occurred. By contrast, a fail value in the ROB indicates an error has occurred. When an error has occurred, a recovery mechanism can be invoked when the operation reaches the commit pipeline stage (e.g., machine check, trap or hardware retry starting with the first instruction affected by the error if the error detection is precise, i.e., the operation did not modify any architectural state).

The execution of FP operations is more complex than the execution of simple integer arithmetic operations because the FP source operands must first be separated into sign, exponent, and mantissa. Once separated, each of those fields participate differently in the calculation of the result of the FP operation. For example, some feedback is needed between the exponent arithmetic and the mantissa arithmetic in order to align the mantissa before starting the mantissa operation and for adjusting the exponent when the mantissa of the result is normalized. The exponent and mantissa data operations which are part of the FP operation execution are shown in FIG. 6 as source operand align logic 363, FP operation on sign and exponent 363, FP operation on mantissa, 364, and normalization and rounding logic 365. The result data, if any, is generated by concatenating together the sign, exponent, and mantissa bits of the result and then saved in the result register. The result data is also bypassed, as needed, to dependent operations. The result register data is saved in the FP PRF register file 312 and is supplied to result residue generator 382 to generate the result data's residue. The result data's residue is compared with the residue value "calculated" using the residues of the source operands. This comparison detects eventual errors in the execution unit that executes the FP operation. The BRB result data's residue (i.e., not the "calculated residue") is saved in the FP PRF register file 312 and sent to the residue bypass multiplexor 350E. This allows dependent operations and the FP PRF register file 312 to obtain the result residue value together with the result data even when the designers decide to forego checking some FP or non-FP operations of that port (i.e., when the "calculated residue" is not generated).

The source operand residue generator 360 generates the BRB residue for each source data received from the bypass multiplexor 350D in order to compare it to the corresponding residue received from the same source as the data. Here, the comparison is performed for source data error detection. The source operand residue generator 360 also generates the source operand residues used to calculate the expected residue of the result. Although FIG. 6 primarily depicts error detection for FP operations, using residue checking, errors in a mixture of FP operations and non-FP operation types, such as bit manipulation, can also be detected. The residues used to check most of these operations can be provided by the residue generator logic described in connection with in FIG. 7.

Figure 7:
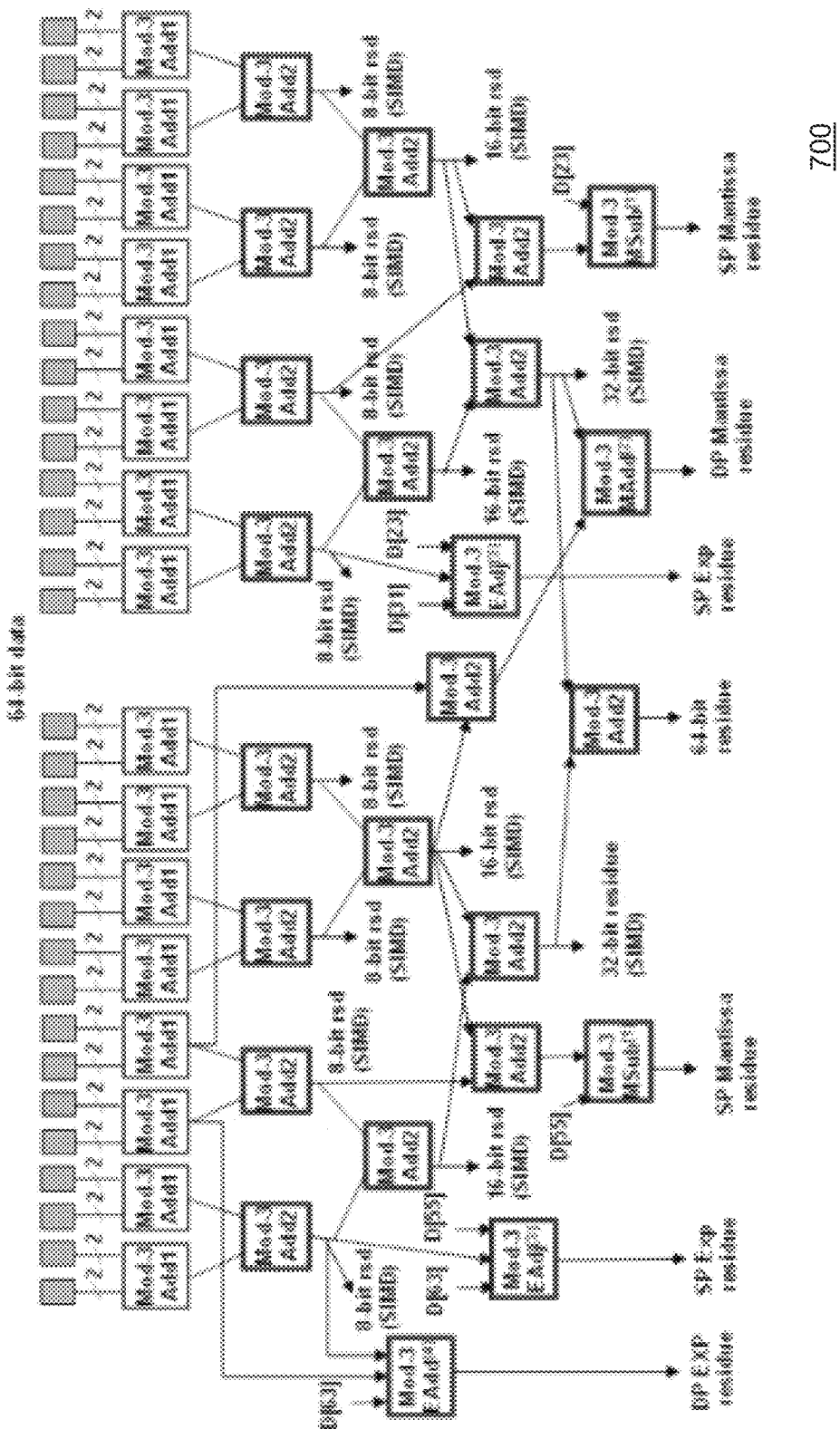
FIG. 7 illustrates residue generation according to another example embodiment of the present invention.

The residue side in FIG. 6 (i.e., the logic that calculates the expected residue of the result) receives the source exponent residues and the source mantissa residues from the source operand residue generator block 360, which can be implemented as shown in FIG. 7. The source mantissa residues can be used to calculate the residue of the result's mantissa in the calculated FP operation's mantissa residue block 367. Meanwhile, the source exponent residues are used to calculate the result's exponent in the calculate FP operation's sign and exponent residue block 368. Source residues are not sufficient for those blocks 367 and 368 to perform their residue calculation correctly. For FP operations which require alignment of one of their source operands, both blocks 367 and 368 receive alignment information from source operand align logic 363 indicating which source operand is shifted and the least significant bit of the shift count.

The result exponent and mantissa residues calculated by the FP operation's sign and exponent residue block 368 and the FP operation's mantissa residue block 367, respectively, are values before normalization and rounding. As normalization logic performs shifting of the data as well as exponent adjustment, while rounding eliminates a number of data bits, feedback from the data side of the FP execution unit is used to adjust the residue calculated thus far. For normalization adjustment of the result residue's mantissa and exponent, the least significant bit of the shift count is used. For rounding adjustment of the result residue's mantissa, the residue of the eliminated bits of the mantissa are used (i.e., the ones used to also generate the sticky bit in the IEEE-754 FP standard). Also provided is whether the FP number for the result is denormalized or normalized, if it is a special value or not, and also the rounding value (zero or one). The adjust for normalizing and rounding logic 369 uses the feedback information from the data side to calculate the result's residue by adjusting the mantissa and exponent residues received from the FP operation's sign and exponent residue calculator 368 and FP operation's mantissa residue calculator 367, respectively. The adjusted exponent and mantissa residues and the result's sign bits are "fused" together to calculate the expected result residue. At comparator 390G, this calculated residue is then compared with the BRB residue generated on the data side by the result residue generator 382. The result of this comparison is a pass or fail event, the result of which is sent to the re-order buffer. A pass indicates that no error has occurred. A fail value in the ROB indicates that an error has occurred. When an error has occurred, a recovery mechanism can be invoked when the operation reaches the commit pipeline stage.

The example embodiment of FIG. 6 provides improved error detection. For example, residue checking for a FP multiply operation, where the residue of one of the source operands' mantissa is zero and the other operand's mantissa has a bit error, will not detect that source operand error if error detection depends solely on the result's residue checking. The example embodiment of FIG. 6 will detect this error as part of the source operand checking. Because source operand residue checking is provided, the example embodiment of FIG. 6 also ensures that "punting" on checking certain operations constrains the loss of coverage to only the execution logic.

The execution units (FMUL, FADD, FMA, etc.) of a core's FPUs and eventual VPUs are grouped into a number of "ports." The execution units belonging to the same port share the port's source operand registers, bypass multiplexors, result register, etc. Only one of the execution units of a given port can operate at a given time. However, execution units belonging to separate ports can execute in parallel.

FIG. 7 illustrates residue generator 700 according to an example embodiment of the present invention.

As shown in FIG. 7, the residue generation also produces 8-bit, 16-bit, and 32-bit residues as intermediate terms during 64-bit residue generation. A FP port might also execute non-FP operations (e.g., scalar or SIMD) with source operands of different sizes. However, the FP operations themselves work on structured data, with different groups of bit(s) representing the sign, the exponent, and the mantissa of the source operands. While the sign can be represented by one bit, the residues of the source operands' exponents and mantissa can be also generated with very few extra gates by using the intermediate terms of the 64 bit residue generation. This is illustrated in example shown in FIG. 7 for IEEE-754 FP single-precision (32-bit) and FP double-precision (64-bit) formats.

Another feature illustrated in FIG. 7 is that all of the data bits participate in the generation of the residue. As a result, if any of the source data bits are wrong, the (BRB) residue generated for the data will differ from the source residue received together with the data. This allows the residue generated by the result residue generator logic 382 of FIG. 6 to be saved in the FP PRF register file 312 and/or to be bypassed together with the data as a way to detect errors in those registers, bypass multiplexors 350D and 350E when the same register is used as a source operand by a dependent operation.

Any residue size or type can be obtained as a result of the source residue checking. Accordingly, in order to minimize overhead, the residue saved in the register file can be as large a data size as desired. For example, for some FP implementations, the data size could be 128 bits, so the residue saved in the register file is for 128 bits. A data size of 128 bits would be used even if the executed FP operations and/or other operation types are using smaller operand sizes (e.g., 8 bits, 16 bits, 32 bits, 64 bits) and types (e.g., FP scalar, SIMD etc.).

Figure 8:
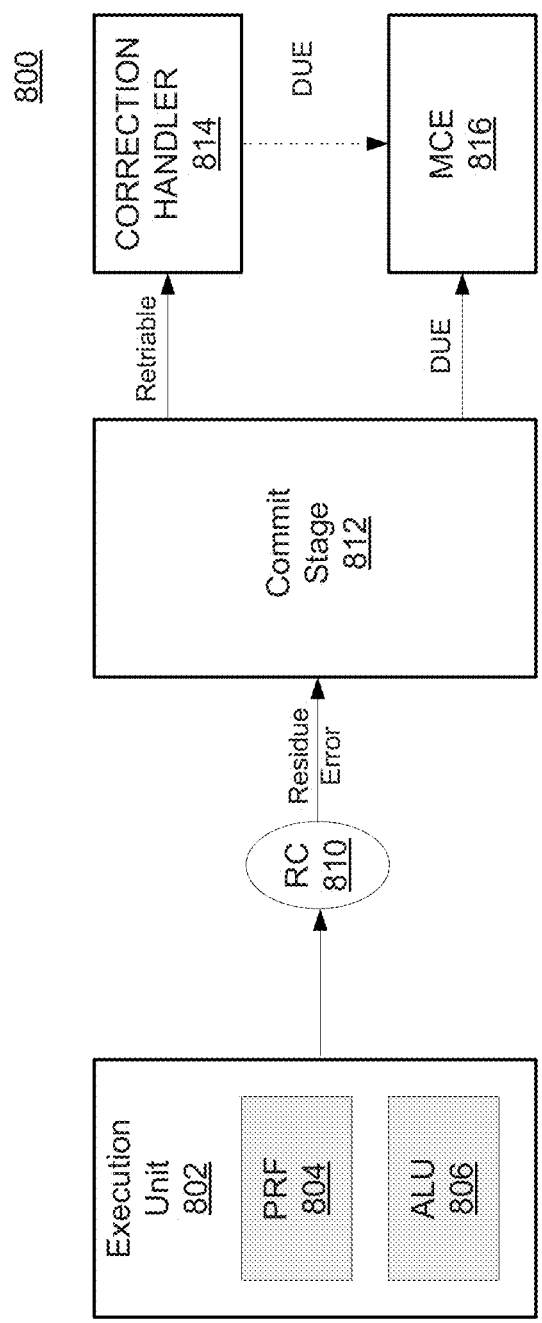
FIG. 8 is a simplified block diagram of an error recovery system according to an example embodiment of the present invention.

FIG. 8 is a simplified block diagram of an error recovery system 800 according to an example embodiment of the present invention.

The system 800 includes one or more execution units 802 with access to a physical register file (PRF) 804 and an arithmetic logic unit (ALU) 806, a residue check (RC) 810, a commit stage 812, a correction handler 814, and a machine check error (MCE) logic. The system 800 may include various other known components (not shown) to perform algorithms to process data, in accordance with the present invention.

The execution unit 802 may include the PRF 804, ALU 806, and other various known components (not shown). The execution unit 802 may receive executable instructions other components of a processor and may also include a re-order buffer (ROB). For example, the ALU 806 may execute operations while referencing data that resides in the PRF 804 and/or other resources based on the operations.

The PRF 804 and ALU 806 may be coupled to the RC 810. The RC 810 may include logic to check the integrity of the registers in the PRF 804. The RC 810 may also include logic to check the integrity of the operations executed in the ALU 806. The RC 810 may be based on a mathematical operation mod3. As discussed above, mod3 is based on the residue of a division by three operation (i.e., remainder after dividing by integer 3). Divider values other than three (for example Merrill numbers like 7, 15 etc.) can also be used. The RC 810 may be based on the relationship between the residue of each integer component of an arithmetic operation and a residue of the result of the arithmetic operation. The relationship between the two residue values must remain consistent (i.e., the same) for an error-free operation. Conversely, the relationship between the two residue may differ for an operational error.

When a residue error is detected, the RC 810 may communicate any detected residue error(s) to the commit stage 812. Also, in an embodiment, the RC 810 may be integrated in the execution unit 802 and specifically may be integrated in the PRF 804 and ALU 806. The commit stage 812 may generate a residue error report with a timestamp indicating at what time the error(s) in the residue errors were detected. The commit stage 812 may then classify the residue errors as being either retriable errors (which are potentially correctable) or detectable and uncorrectable errors (DUE).

If the commit stage 812 determines the error(s) are retriable, it may call the correction handler 814. On the other hand, if the commit stage 812 determines the error(s) are uncorrectable, it may call a MCE 816 since it may be too late to correct the errors and the operation should be brought to a halt using the MCE. The correction handler 814 may attempt to recover the detected error clearing the pipeline and initiating the re-execution of the instructions starting with the instruction associated with the error detection. If the re-execution succeeds, the error was corrected without the need to call a MCE, which as described herein can result in the failure of the executing software. On the other hand, if the re-execution fails, the correction handler 814 may call a MCE 816.

It will be apparent to those skilled in the art that various modifications and variations can be made to the present invention without departing form the spirit or scope of the invention. Thus, it is intended that the present invention cover the modifications and variations of this invention provided they come within the scope of the appended claims and their equivalents.

What is claimed is:

1. An error detection unit, comprising:
one or more register files that store at least one operand and at least one operand residue;
an operand multiplexor operable to receive the operand;
a residue multiplexor operable to receive the operand residue;
a source operand residue generator operable to generate at least one generated residue from the operand;
a first comparator that compares the operand residue to the generated residue, the result of the first comparator being sent to a reorder buffer;
an execution unit that supplies the operand to a residue calculator and a result residue generator, wherein the residue calculator operable to determine an expected residue and the result residue generator operable to generate a result residue; and
a second comparator that compares the expected residue with the result residue, the result of the second comparator being sent to the reorder buffer.

2. The error detection unit according to claim 1, wherein the result residue is stored in at least one of the register files and retrieved on read by a dependent instruction and sent to the residue multiplexor.

3. The error detection unit according to claim 1, wherein when result data of a result register is bypassed to the data multiplexor while being written to the register file, the corresponding result residue is bypassed to the residue multiplexor, while being written to the register file.

4. An error detection unit, comprising:
one or more register files that store at least one operand and at least one operand residue;
an operand multiplexor operable to receive the operand;
a residue multiplexor operable to receive the operand residue;
an execution unit operable to generate a virtual address based on the operand, the virtual address being supplied to a data translation buffer, the data translation buffer generating an address residue and page number based on the virtual address;
a first comparator that compares the operand residue to the address residue; and
a second comparator that compares the page number with a second page number supplied by the execution unit.

5. An error detection unit, comprising:
one or more register files that store at least one floating point operand and at least one operand residue;
an operand multiplexor operable to receive the floating point operand;
a residue multiplexor operable to receive the operand residue;
a source operand residue generator operable to generate at least one generated residue from the floating point operand;
a first comparator that compares the operand residue to the generated residue, the result of the first comparator being sent to a reorder buffer;
a floating point execution unit that supplies the operand to a residue calculator and a result residue generator, wherein the residue calculator operable to determine an expected residue and the result residue generator operable to generate a result residue; and
a second comparator that compares the expected residue with the result residue, the result of the second comparator being sent to the reorder buffer.

6. The error detect unit according to claim 5, wherein the result residue is stored in at least one of the register files and retrieved on read by a dependent instruction and sent to the residue multiplexor.

7. The error detection unit according to claim 5, wherein when result data of a result register is bypassed to the data multiplexor while being written to the register file, the corresponding result residue is bypassed to the residue multiplexor, while being written to the register file.

8. A method for error detection, comprising:
storing at least one operand and at least one operand residue in one or more register files;
receiving the operand at an operand multiplexor;
receiving the operand residue a residue multiplexor;
generating at least one generated residue from the operand at a source operand residue generator;
comparing, at a first comparator, the operand residue to the generated residue, the result of the first comparator being sent to a reorder buffer;
supplying the operand to a residue calculator and a result residue generator, wherein the residue calculator determines an expected residue and the result residue generator generates a result residue; and
comparing, at a second comparator, the expected residue with the result residue, the result of the second comparator being sent to the reorder buffer.

9. The method for error detection according to according to claim 8, wherein the result residue is stored in at least one of the register files and retrieved on read by a dependent instruction and sent to the residue multiplexor.

10. The method for error detection according to according to claim 8, wherein when result data of a result register is bypassed to the data multiplexor while being written to the register file, the corresponding result residue is bypassed to the residue multiplexor, while being written to the register file.

11. A method for error detection unit, comprising:
storing at least one operand and at least one operand residue in one or more register files;
receiving the operand at an operand multiplexor;
receiving the operand residue a residue multiplexor;
generating a virtual address based on the operand at an execution unit, the virtual address being supplied to a data translation buffer, the data translation buffer generating an address residue and page number based on the virtual address;
comparing, at a first comparator, the operand residue to the address residue; and
comparing, at a second comparator, the page number with a second page number supplied by the execution unit.

12. A method for error detection, comprising:
storing at least one floating point operand and at least one operand residue in one or more register files;
receiving the floating point operand at an operand multiplexor;
receiving the operand residue a residue multiplexor;
generating at least one generated residue from the floating point operand at a source operand residue generator;

comparing, at a first comparator, the operand residue to the generated residue, the result of the first comparator being sent to a reorder buffer;

supplying the floating point operand to a residue calculator and a result residue generator, wherein the residue calculator determines an expected residue and the result residue generator generates a result residue; and comparing, at a second comparator, the expected residue with the result residue, the result of the second comparator being sent to the reorder buffer.

13. The method for error detection according to according to claim 12, wherein the result residue is stored in at least one of the register files and retrieved on read by a dependent instruction and sent to the residue multiplexor.

14. The method for error detection according to according to claim 12, wherein when result data of a result register is bypassed to the data multiplexor while being written to the register file, the corresponding result residue is bypassed to the residue multiplexor, while being written to the register file.

15. A system comprising:
a memory; and
a processor including,
a port including a register file and an arithmetic logic unit, the register file storing at least one operand and at least one operand residue;
an error detector, coupled to the arithmetic logic unit, configured to detect an error, the error detector including,
an operand multiplexor operable to receive the operand;
a residue multiplexor operable to receive the operand residue;
a source operand residue generator operable to generate at least one generated residue from the operand;
a first comparator that compares the operand residue to the generated residue, the result of the first comparator being sent to a reorder buffer;
an execution unit that supplies the operand to a residue calculator and a result residue generator, wherein the residue calculator operable to determine an expected residue and the result residue generator operable to generate a result residue; and
a second comparator that compares the expected residue with the result residue, the result of the second comparator being sent to the reorder buffer.

* * * * *